United States Patent
Mohlmann et al.

(10) Patent No.: US 9,681,393 B2
(45) Date of Patent: Jun. 13, 2017

(54) APPARATUS, VEHICLE, METHOD, AND COMPUTER PROGRAM FOR SETTING A TRANSMISSION POWER

(71) Applicant: Alcatel Lucent, Boulogne Billancourt (FR)

(72) Inventors: Ulrich Mohlmann, Stuttgart (DE); Rainer Ritzenhoff, Stuttgart (DE); Franz Josef Gunster, Stuttgart (DE); Frank Gerlach, Stuttgart (DE); Markus Wabner, Stuttgart (DE); Peter Fertl, Munich (DE)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/906,801

(22) PCT Filed: Jul. 21, 2014

(86) PCT No.: PCT/EP2014/065616
§ 371 (c)(1),
(2) Date: Jan. 21, 2016

(87) PCT Pub. No.: WO2015/011089
PCT Pub. Date: Jan. 29, 2015

(65) Prior Publication Data
US 2016/0165548 A1   Jun. 9, 2016

(30) Foreign Application Priority Data

Jul. 23, 2013   (EP) .................................... 13306065

(51) Int. Cl.
*H04B 7/00* (2006.01)
*H04W 52/24* (2009.01)
(Continued)

(52) U.S. Cl.
CPC .......... *H04W 52/24* (2013.01); *H04B 1/3822* (2013.01); *H04B 7/155* (2013.01);
(Continued)

(58) Field of Classification Search
CPC ... H04W 52/24; H04W 52/244; H04W 52/36; H04W 52/46
(Continued)

(56) References Cited

U.S. PATENT DOCUMENTS

| 7,835,762 B2 | 11/2010 | Sendonaris | |
| 2010/0234071 A1* | 9/2010 | Shabtay | H04B 7/0408 455/562.1 |
| 2011/0009056 A1* | 1/2011 | Hanson | H04B 7/15535 455/9 |

FOREIGN PATENT DOCUMENTS

| JP | 2005-531266 A | 10/2005 |
| JP | 2010-177909 A | 8/2010 |

(Continued)

OTHER PUBLICATIONS

3rd Generation Partnership Project; Technical Specification Group Radio Access Network; LTE; Evolved Universal Terrestrial Radio Access (E-UTRA); FDD Home eNode B (HeNB) Radio Frequency (RF) requirements analysis (3GPP TR 36.921 version 11.0.0 Release 11), ETSI TR 136 921 V11.0.0, 45 pages, XP050649922, Oct. 2012.

(Continued)

*Primary Examiner* — Wesley Kim
*Assistant Examiner* — Raj Chakraborty
(74) *Attorney, Agent, or Firm* — Fay Sharpe, LLP

(57) ABSTRACT

Embodiments provide an apparatus, a vehicle, a method, and a computer program for setting a transmission power. The apparatus (10) is operable to set a transmission power of a vehicular relay transceiver (100) in a mobile communication (Continued)

system (400). The relay transceiver (100) is operable in a vehicle (500) to relay information between a mobile transceiver (200) associated with the relay transceiver (100) and a base station transceiver (300) of the mobile communication system (400). The apparatus (10) comprises a transceiver module (12) which is operable to transmit a common signal using a transmission power. The transmission power influences a coverage area of the relay transceiver (100). The relay apparatus (10) further comprises a controller module (14) operable to determine information related to a quality of a radio link between the relay transceiver (100) and the base station transceiver (300) and information on a state of the vehicle (500). The controller module (14) is further operable to set the transmission power based on the information related to the quality of the radio link and based on the information on the state of the vehicle (500).

14 Claims, 10 Drawing Sheets

(51) Int. Cl.
*H04B 7/155* (2006.01)
*H04W 52/46* (2009.01)
*H04B 1/3822* (2015.01)
*H04W 52/36* (2009.01)
*H04W 52/60* (2009.01)

(52) U.S. Cl.
CPC ...... *H04B 7/15535* (2013.01); *H04W 52/244* (2013.01); *H04W 52/36* (2013.01); *H04W 52/46* (2013.01); *H04W 52/60* (2013.01)

(58) Field of Classification Search
USPC .......................................................... 455/522
See application file for complete search history.

(56) References Cited

FOREIGN PATENT DOCUMENTS

| WO | WO2013/083198 | * | 6/2013 | ............ H04W 52/24 |
|----|---------------|---|--------|------------------------|
| WO | WO 2013/083198 A1 | | 6/2013 | |

OTHER PUBLICATIONS

International Search Report for PCT/EP2014/065616 Oct. 28, 2014.

\* cited by examiner

APPARATUS, VEHICLE, METHOD, AND COMPUTER PROGRAM FOR SETTING A TRANSMISSION POWER

Embodiments of the present invention relate to communication networks, more particularly but not exclusively to resource management in networks with relay stations.

BACKGROUND

Demands for higher data rates for mobile services are steadily increasing. At the same time modern mobile communication systems as 3rd Generation systems (3G) and 4th Generation systems (4G) provide enhanced technologies, which enable higher spectral efficiencies and allow for higher data rates and cell capacities. Users of today's handhelds become more difficult to satisfy. While old feature phones generated only data or voice traffic, current smartphones, tablets, and netbooks run various applications in parallel that can fundamentally differ from each other. Compared to conventional phones, this application mix leads to a number of new characteristics. For example, highly dynamic load statistics result, where the average load is increasing. Moreover, the number of networks for voice and data access is also increasing, therewith roaming options between these networks become available when multiple network layers overlap or at network boundaries, respectively.

Today's network planning and deployment in cellular communication systems is based on fixed, stationary base stations. However, the cellular radio coverage inside of vehicles, e.g. cars, buses, trains, ships, planes, etc., is subject to changing Radio Frequency (RF) conditions and penetration losses due to the vehicle body. For this reason, customers, who use their Consumer Electronics (CE) devices, e.g. smartphone, tablet, computer, inside vehicles to consume mobile broadband data or voice services, may perceive a severe quality-of-service degradation.

Document WO 2013/083198 A1 describes a method for adapting the output power of a radio transmitting entity within a cage having at least one aperture. Document B. A. Bakamis, "Power Control/Allocation Solutions for Mobile Relays for Future Cellular Systems", 2005 6th IEE International Conference on 3G and Beyond, addresses power allocation/control for common/broadcast channels for mobile relays.

SUMMARY

Embodiments are based on the finding that a relay node can be used to improve the cellular coverage in the vehicle and to connect multiple terminals inside of a vehicle. An aggregated connection to a stationary cellular communication system can be provided via a wireless backhaul link to a stationary cellular communications network, e.g. using an external vehicle antenna. In the following the link between a stationary base station and an external antenna of a vehicle relay node will be denoted as relay link; the link between a relay node and end user terminals will be denoted as access link.

Such a relay node may, for example, correspond to a relay as defined in $3^{rd}$ Generation Partnership Project (3GPP) Release 10, a moving relay as currently discussed in 3GPP Release 12 study groups and in current research literature, a wireless repeater (analog or digital), or a femto cell with a wireless backhaul connection. In case of a femto cell, the wireless backhaul connection could be provided over a separate cellular communication terminal, e.g., a 2G/3G/4G modem. It is another finding that for the relay link and for the access link, respectively, the same or different frequency and spectrum resources can be used.

Note that in the following description of embodiments the term "femto cell" will be used as a synonym for the term "Home eNodeB (ENB)" as used in 3GPP standards, for small cells, such as micro, pico, femto cells, etc., as well as relay nodes defined according to 3GPP Release 10 & following releases.

Embodiments are based on the finding that femto cells and home (e)NBs may use an adaptive power control scheme to adjust their transmit power, e.g., the power of the Common PIlot CHannel (CPICH) power for Universal Mobile Telecommunication System (UMTS) femto cells or home NodeBs (NB). 3GPP Technical Recommendation (TR) 36.921 Frequency Division Duplex (FDD) Home eNode B (HeNB) Radio Frequency (RF) requirements analysis describes a hybrid cell power management. In this way, only acceptable interference may be caused to a macro layer network and a certain quality-of-service for involved User Equipments (UEs) that camp on the femto cell may be guaranteed. For this approach the femto cell may listen to the radio environment, make measurements of current noise and power levels of the neighbor cells, and then adjust its maximum Transmit (TX)-power to a level where it causes an acceptable amount of interference. In the following this procedure may be denoted simply as power control procedure.

Furthermore, the femto cell may undergo a power control procedure at the boot-up of the femto cell. The procedure may be repeated from time to time in order to adapt to changing neighbor cell environment. It is a further finding that vehicular relay nodes may have limitations regarding interference to other cells and to UEs outside of the vehicle that camp on the macro cell layer, especially in co-channel operation mode, where a relay node and macro cell use the same frequency band. Careful setting of the transmit power of the vehicular relay node may be carried out in order to achieve a reasonable signal condition for UEs inside the vehicle while causing acceptable interference outside of the vehicle. This may even be more important if the femto cell is limited to a closed subscriber group, cf. also to 3GPP Technical Specification (TS) 25.367 Mobility procedures for Home Node B (HNB).

Embodiments are based on the finding that usually the vehicle body helps to reduce the vehicular relay node's signal that is emitted outside of the vehicle, since the signal experiences an attenuation of about 10 dB due to the metalized car body. Nevertheless, an adaptive power control scheme may be used in order to keep the out-of-vehicle interference caused by the relay node at an acceptable level or at a minimum. According to other findings the following points influence the coverage area of the vehicular relay node and thus the interference caused outside of the vehicle. First, there is the signal strength of the serving macro base station, i.e. a base station which generates a coverage area that at least partly surrounds the coverage area of a considered relay node, which may correspond to a small cell such as a femto cell. If the relay node and the serving macro cell are in co-channel operation mode, the signal strength of the macro cell influences the coverage are of the relay node. If the vehicular relay node is close to the macro cell base station, i.e., if the path loss or the attenuation between macro and relay is small, the macro cell signal may supersede the relay node signal and thus decrease the coverage area of the relay node. On the other hand if the path loss between macro base station and relay node is high, which may correspond to a large distance between relay station and macro base station, the coverage area of the relay node may grow. In the later the relay node signal may supersede the macro cell signal.

Embodiments are further based on the finding that open vehicle's windows, doors, or roof-tops further influence the interference condition. Opening and closing the vehicle's windows, doors, or roof-tops influences the attenuation loss of the vehicle and thus the coverage area of the relay node outside of the vehicle. It is a finding that the coverage area and thus the interference depends on the relative distance between vehicular relay node and serving cell, i.e. the quality of the relay link, e.g. on the path loss. Since a vehicle is permanently changing its location in contrast to conventional stationary femto cells, the transmit power of the relay node may permanently or continuously be adjusted. However, this may come at the cost of increased energy or power consumption and chip performance. Moreover, influencing the vehicle attenuation loss by opening windows, doors, or roof-tops, which can hardly be avoided, may make the size of the coverage area of the relay node quite unpredictable.

Embodiments therefore provide an apparatus for setting a transmission power of a vehicular relay transceiver in a mobile communication system. In other words, the apparatus may be adapted to or operable to set the transmission power in a mobile or vehicular relay transceiver; it may be operated or comprised in a mobile or vehicular relay transceiver. The apparatus is therefore also referred to as relay apparatus. Embodiments also provide a mobile or vehicular relay transceiver comprising such a relay apparatus. The relay transceiver is operable in a vehicle to relay information between a mobile transceiver associated with the relay transceiver and a base station transceiver of the mobile communication system.

The mobile communication system may, for example, correspond to one of the mobile communication systems standardized by the $3^{rd}$ Generation Partnership Project (3GPP), e.g. Global System for Mobile Communications (GSM), Enhanced Data rates for GSM Evolution (EDGE), GSM EDGE Radio Access Network (GERAN), High Speed Packet Access (HSPA), Universal Terrestrial Radio Access Network (UTRAN) or Evolved UTRAN (E-UTRAN), Long Term Evolution (LTE) or LTE-Advanced (LTE-A), or mobile communication systems with different standards, e.g. Worldwide Interoperability for Microwave Access (WI-MAX) IEEE 802.16 or Wireless Local Area Network (WLAN) IEEE 802.11, generally any system based on Time Division Multiple Access (TDMA), Frequency Division Multiple Access (FDMA), Orthogonal Frequency Division Multiple Access (OFDMA), Code Division Multiple Access (CDMA), etc. In the following the terms mobile communication system and mobile communication network are used synonymously.

The mobile communication system may comprise a plurality of transmission points or base station transceivers operable to communicate radio signals with a mobile transceiver. In embodiments, the mobile communication system may comprise mobile transceivers, relay station transceivers and base station transceivers. The relay station transceivers and base station transceivers can be composed of one or more central units and one or more remote units.

A mobile transceiver may correspond to a smartphone, a cell phone, User Equipment (UE), a laptop, a notebook, a personal computer, a Personal Digital Assistant (PDA), a Universal Serial Bus (USB)-stick, a tablet computer, a car, etc. A mobile transceiver or terminal may also be referred to as UE or user in line with the 3GPP terminology. A base station transceiver can be located in the fixed or stationary part of the network or system. A base station transceiver may correspond to a remote radio head, a transmission point, an access point, a macro cell, a small cell, a micro cell, a pico cell, a femto cell, a metro cell etc. The term small cell may refer to any cell smaller than a macro cell, i.e. a micro cell, a pico cell, a femto cell, or a metro cell. Moreover, a femto cell is considered smaller than a pico cell, which is considered smaller than a micro cell. A base station transceiver can be a wireless interface of a wired network, which enables transmission and reception of radio signals to a UE, mobile transceiver or relay transceiver. Such a radio signal may comply with radio signals as, for example, standardized by 3GPP or, generally, in line with one or more of the above listed systems. Thus, a base station transceiver may correspond to a NodeB, an eNodeB, a BTS, an access point, etc. A relay station transceiver may correspond to an intermediate network node in the communication path between a base station transceiver and a mobile station transceiver. A relay station transceiver may forward a signal received from a mobile transceiver to a base station transceiver, signals received from the base station transceiver to the mobile station transceiver, respectively.

The mobile communication system may be cellular. The term cell refers to a coverage area of radio services provided by a transmission point, a remote unit, a remote head, a remote radio head, a base station transceiver, relay transceiver or a NodeB, an eNodeB, respectively. The terms cell and base station transceiver may be used synonymously. In some embodiments a cell may correspond to a sector. For example, sectors can be achieved using sector antennas, which provide a characteristic for covering an angular section around a base station transceiver or remote unit. In some embodiments, a base station transceiver or remote unit may, for example, operate three or six cells covering sectors of 120° (in case of three cells), 60° (in case of six cells) respectively. Likewise a relay transceiver may establish one or more cells in its coverage area. A mobile transceiver can be registered or associated with at least one cell, i.e. it can be associated to a cell such that data can be exchanged between the network and the mobile in the coverage area of the associated cell using a dedicated channel, link or connection. A mobile transceiver may hence register or be associated with a relay station or base station transceiver directly or indirectly, where an indirect registration or association may be through one or more relay transceivers.

In embodiments the apparatus comprises a transceiver module which is operable to transmit a common signal using a transmission power. The transmission power influences a coverage area of the relay transceiver. The transceiver module may correspond to any means for transmitting and/or receiving signals, e.g. one or more transceiver units, one or more transceiver devices, etc. In embodiments a transceiver module may comprise typical transceiver, i.e. transmitter and/or receiver components. Such components may comprise one or more transmit and/or receive antennas, a low Noise Amplifier (LNA), a Power Amplifier (PA), one or more filters, a converter, a mixer, a duplexer, a diplexer etc. Hence, in some embodiments the relay transceiver may transmit a common signal. The reception quality of which may determine the coverage area of the relay transceiver.

The relay apparatus further comprises a controller module which is operable to determine information related to a quality of a radio link between the relay transceiver and the base station transceiver and information on a state of the vehicle. In embodiments the controller module can be implemented as any means for controlling, such as one or more controller devices, one or more controller units, etc. In some embodiments the controller module may be implemented in software or as a computer program which can be executed on accordingly adapted hardware, such as a processor, a DSP, a multi-purpose processor, etc. The controller module is further operable to set the transmission power based on the information related to the quality of the radio link and based on the information on the state of the vehicle.

In other words, embodiments may take into account information related to the quality of the relay link and information related to the state of the vehicle and may therefore provide an improved concept for power controlling a vehicular relay station.

In embodiments the information related to the quality of the radio link may correspond to any quality information being indicative on a reception quality for a communication link between a mobile transceiver and the respective base station transceiver the quality is measured for. For example, the information may relate to one or more elements of the group of a path loss, a receive signal reception power, a signal-to-interference ratio, a signal-to-noise ratio, a signal-to-interference-and-noise ratio, or a receive signal strength indicator.

In some embodiments the controller module may be operable to set the transmission power to a first higher value when the information related to the quality of the radio link indicates a first higher quality of the radio link, and the controller module may be operable to set the transmission power to a second lower value when the information related to the quality of the radio link indicates a second lower quality of the radio link. That is to say that a first and a second quality measure are determined for the relay link, where the first quality measure indicates a higher quality of the relay link than the second quality. In some embodiments the controller module is operable to set or configure the transmission power of the relay station to a higher value when the first quality measure is determined than when the second quality measure is determined. Embodiments may provide the advantage that the coverage area of the vehicular relay station may be kept substantially constant with varying distances between the respective vehicle and the serving base station transceiver.

In further embodiments the controller module may be operable to determine the information related to the state of the vehicle based on vehicular sensor data obtained from sensors comprised in the vehicle. That is to say, that in some embodiments data available from the vehicle's sensors may be used or re-used, which may lead to an increased efficiency. The information related to the state of the vehicle may correspond to information related to one or more elements of the group of a body attenuation of the vehicle, a window status, a roof-top status, a door status, a trunk status, a predicted change of a window status, a predicted change of a roof-top status, a predicted change of a door status or a predicted change of a trunk status.

The information related to the state of the vehicle may correspond to information related to a body attenuation of the vehicle with respect to radio signals transmitted from the transceiver module to the mobile transceiver. The controller module may be operable to set the transmission power to a first higher value when the information related to the attenuation of the vehicle body indicates a first higher attenuation, and wherein the controller module is operable to set the transmission power to a second lower value when the information related to the attenuation of the vehicle body indicates a second lower attenuation. That is to say that a first and a second attenuation measure are determined for the attenuation from the inside of the vehicle to the outside of the vehicle, wherein the first attenuation indicates a higher attenuation than the second attenuation value. For example, these attenuation values may be determined based on a leaking signal, which is transmitted in the inside of the vehicle with a certain transmission power and which can be received on the outside of the vehicle with a certain reception power. The loss measured for such a signal may determine an attenuation measure for the vehicle. In some embodiments the controller module may be operable to set or configure the transmission power of the relay station to a higher value when the first attenuation measure is determined than when the second attenuation measure is determined. Embodiments may provide the advantage that the coverage area of the vehicular relay station may be kept substantially constant outside of the vehicle with varying vehicle attenuation, i.e. when doors, windows, or roof-tops are open and closed.

In further embodiments the transceiver module may be operable to communicate with the mobile transceiver using an adaptable antenna pattern of an adaptable antenna comprising one or more antenna elements located in the vehicle. In some embodiments the controller module may be further operable to adapt the adaptable antenna pattern based on an angle of arrival of a signal received at the relay transceiver from the base station transceiver.

That is to say that the interference experienced inside and outside of the vehicle may depend on the angle of arrival of the signals from the base station transceiver. Hence on a side of the vehicle, which is directed towards the base station transceiver, the signals from the base station transceiver may be stronger than on another side of the vehicle, which is faced away from the base station transceiver. This can be considered in some embodiments using multiple antennas inside of the vehicle, which are then used to serve different areas within the vehicle with different signal strengths, i.e. a side of the vehicle directed towards the base station transceiver may be provided with stronger signals from the relay transceiver than a side of the vehicle which is faced away from the base station transceiver, or vice versa. This can be achieved, for example, by means of beamforming in the vehicle or by means of using a plurality of independent antennas serving sub-areas in the vehicle, which can then be controlled and used with different transmission power settings, such that the individual coverage areas of the individual antennas are adjusted accordingly. In other words, in embodiments the coverage area of the relay apparatus in shape and size may depend on the angle of arrival of the macro signal from the base station transceiver. This may result in a shift of the coverage area of the relay depending on the strength of the macro signal and an unacceptable performance at specific positions inside the vehicle may be avoided by some embodiments.

In some embodiments the controller module may be further operable to adapt the adaptable antenna pattern based on the information related to the state of the vehicle. The adaptable antenna may correspond to a beamforming or beam-switching antenna comprising a plurality of antenna elements, or the adaptable antenna may correspond to a tiltable antenna, which can be mechanically or electrically tiltable. The controller module may be operable to adapt the adaptable antenna by forming or switching different beams or by tilting the antenna. Embodiments may therefore provide service continuity under changing conditions, e.g. doors or windows open and close, using one or more adaptive antennas. The controller module may be operable to adapt the adaptable antenna based on information related to one or more elements of the group of sensor signals, door contacts, window openers or roof-top contacts.

In some embodiments the controller module may be operable to determine information related to a velocity of the vehicle and the controller module may be further operable to set a repetition rate for transmission power adaptations based on the information related to the velocity of the vehicle. Hence, the transmit power adaptation may be adapted to the speed or velocity of the vehicle. Hence, when the vehicle moves fast, e.g. with a velocity higher than a pre-determined threshold, the power control adaptation cycle may be set to a less frequent value. Embodiments may therewith provide an improved concept for power control as a higher efficiency may be achieved not executing the power control procedure when it can be anticipated that the condition of vehicle has not changed.

In further embodiments the controller module is operable to set the repetition rate to a first more frequent repetition cycle when the information on the velocity of the vehicle indicates a slower first velocity and the controller module is operable to set the repetition rate to a second less frequent repetition cycle when the information on the velocity of the vehicle indicates a faster second velocity. That is to say that a first and a second velocity measure may be determined for the vehicle, where the first velocity measure indicates a higher velocity of the vehicle than the second velocity measure. In some embodiments the controller module is operable to set or configure the transmission power of the relay station to a more frequent value when the second velocity measure is determined than when the first velocity measure is determined. Embodiments may provide the advantage that the efficiency of the overall power control concept is improved by adapting the repetition cycle of the power control procedure to the velocity of the vehicle.

Moreover, the controller module may be operable to set the repetition rate based on information related to one or more elements of the group of a vehicle acceleration, revolutions per minute, a camera or camera system, a radar sensor, a LIght Detection and Ranging or Laser Imaging Detection and Ranging (LIDaR) sensor, a location of the vehicle, a route, an arrival at the target destination, usage of park distance control sensors, vehicular traffic, or load of the communication system. That is to say that these measured quantities or information related thereto may be used for power control adaptation in embodiments.

Embodiments further provide a vehicle comprising the above relay apparatus.

Embodiments further provide a method for setting a transmission power of a vehicular relay transceiver in a mobile communication system. The relay transceiver is operable in a vehicle to relay information between a mobile transceiver associated with the relay transceiver and a base station transceiver of the mobile communication system. The method comprises transmitting a common signal using a transmission power, the transmission power influencing a coverage area of the relay transceiver. The method further comprises determining information related to a quality of a radio link between the relay transceiver and the base station transceiver and information on a state of the vehicle. The method further comprises setting the transmission power based on the information related to the quality of the radio link and based on the information on the state of the vehicle.

Embodiments further provide a computer readable storage medium storing instructions which, when executed by a computer, cause the computer to implement one of the methods described herein. Other embodiments are a computer program or a computer program product having a program code for performing anyone of the above described methods, when the computer program or computer program product is executed on a processor, computer, or programmable hardware.

Embodiments may provide the advantage that an adaptation of the transmit power and the coverage area of a vehicular relay node is enabled in such a way that the interference of the relay node to a macro layer outside of the vehicle is reduced or minimum, while the signal quality of the relay node inside the vehicle is improved or maximized. Embodiments may realize this achievement by taking into account vehicle sensor and/or context information, path loss or received signal measurements, and propagation or attenuation characteristics of specific vehicle models. Moreover, embodiments may allow for reducing the power or energy consumption and also the required computational complexity of the vehicular relay node. Embodiments may improve handover preparations in a smart and efficient way and may thus reduce the latencies involved in the handover procedure. Moreover, embodiments may allow for reducing the power consumption of a vehicular relay node.

BRIEF DESCRIPTION OF THE FIGURES

Some other features or aspects will be described using the following non-limiting embodiments of apparatuses and/or methods and/or computer programs and/or computer program products by way of example only, and with reference to the accompanying figures, in which.

Various example embodiments will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the invention. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
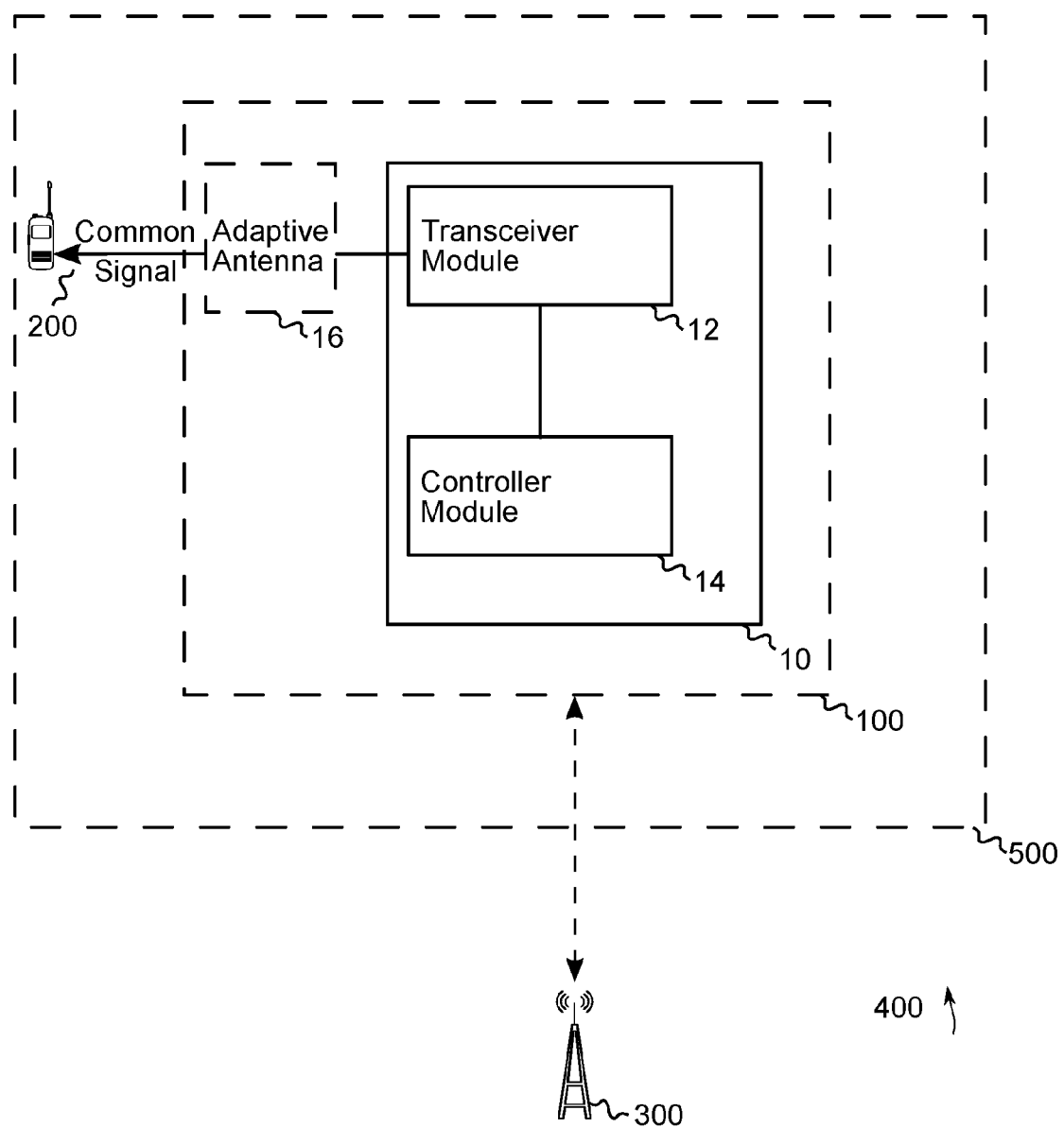
FIG. 1 illustrates an embodiment of an apparatus for setting a transmission power of a vehicular relay transceiver.

Optional components in the following figures are shown using dashed or dotted lines. FIG. 1 illustrates an embodiment of an apparatus 10 for setting a transmission power of a vehicular relay transceiver 100 in a mobile communication system 400. In the present embodiment the mobile communication system is assumed to be an LTE or LTE-A system. The relay transceiver 100 corresponds to a femto cell inside the vehicle 500. The relay transceiver 100 is operable in the vehicle 500 to relay information between a mobile transceiver 200 associated with the relay transceiver 100 and a base station transceiver 300 of the mobile communication system 400.

The apparatus 10 comprises a transceiver module 12 which is operable to transmit a common signal using a transmission power, which influences a coverage area of the relay transceiver 100. The transceiver module 12 is operable to transmit the common signal according to the LTE or LTE-A specifications. The relay apparatus 14 further comprises a controller module 14, which is coupled to the transceiver module 12, and which is operable to determine information related to a quality of a radio link between the relay transceiver 100 and the base station transceiver 300, and operable to determine information on a state of the vehicle 500. The controller module 14 is further operable to set the transmission power based on the information related to the quality of the radio link and based on the information on the state of the vehicle 500. As shown in FIG. 1 the relay apparatus 10 further comprises an optional adaptive antenna 16, which is used to communicate signals with the mobile transceiver 200 and which is coupled to the transceiver module 12.

Figure 2:
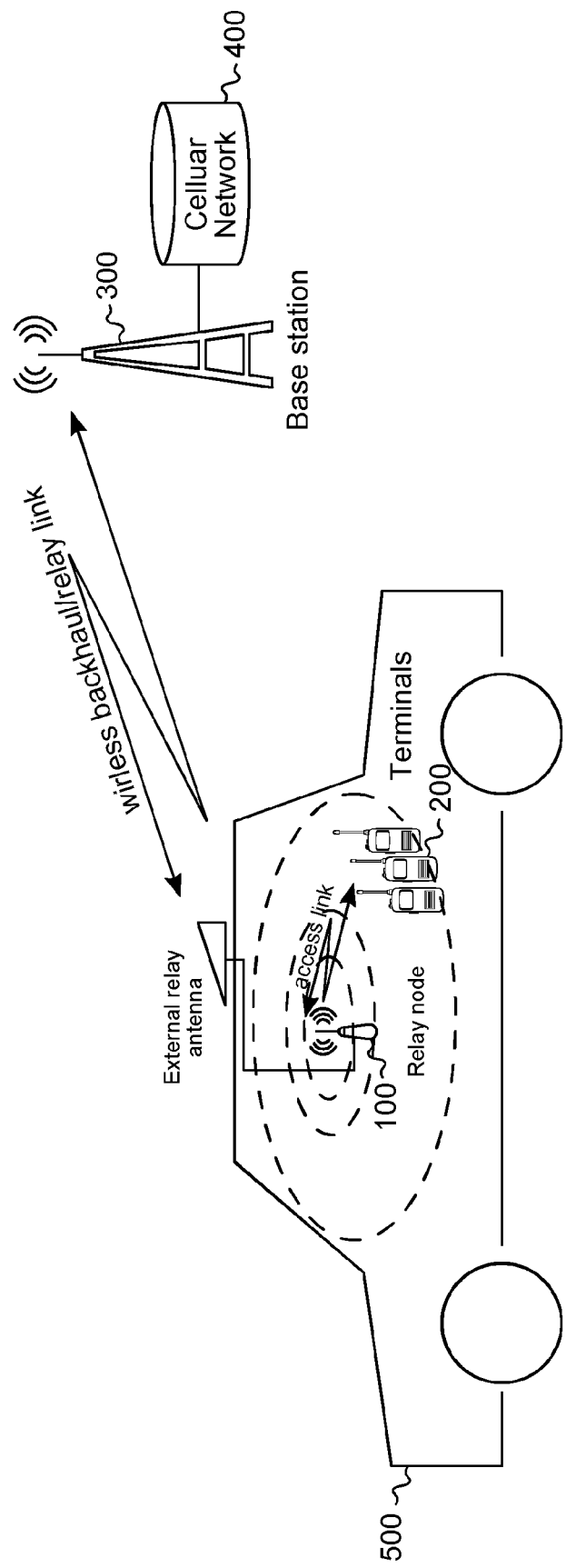
FIG. 2 shows an embodiment of a vehicle with a relay transceiver.

In the following the vehicle 500 is assumed to be a car, as shown in FIG. 2. FIG. 2 illustrates an embodiment of a vehicle 500, which is shown as an exemplified car, and which comprises a relay transceiver 100 with the apparatus 10 as shown in FIG. 1. The relay transceiver 100 is denoted as relay node 100 in FIG. 2. FIG. 2 shows a plurality of mobile transceivers 200 which communicate with the relay station 100 inside the vehicle 500 via an access link. The relay node 100 further comprises a relay antenna which is external to the vehicle 500 and which is used to communicate with the base station 300 via a relay link to which it is also referred to as wireless backhaul. Moreover, the communication network 400 is exemplified in FIG. 2 as being coupled with the base station transceiver 300.

In an embodiment illustrated in FIGS. 1 and 2 an adaptation of the transmit power of the vehicular relay node 100 is based on the path loss between the serving base station 300 and the vehicular roof-top antenna, i.e. the external relay antenna. That is to say in the present embodiment the information related to the quality of the relay link corresponds to the said path loss.

The transmit power of the vehicular relay node, denoted as P, can be described by a function $f$ that depends on the path loss PL between the serving base station 300 and the vehicular roof-top antenna as $P=f(PL)$, where $f(PL)$ may be a monotonic decreasing function of PL. In the present embodiment, P is decreased for increasing PL. That is to say that the controller module 14 is operable to set the transmission power P to a first higher value $P_{High}$ when the information related to the quality of the radio link indicates a first higher quality, i.e. a lower path loss $PL_{Low}$, of the radio link. The controller module 14 is operable to set the transmission power P to a second lower value $P_{low}$ when the information related to the quality of the radio link indicates a second lower quality, i.e. a higher path loss $PL_{High}$, of the radio link, wherein $P_{High}>P_{low}$ and $PL_{High}>PL_{Low}$.

The path loss can be seen as one possibility for a quality measure used in an embodiment. Since the path loss may be difficult to estimate, an equivalent measure may be used that relates to the received signal. In other embodiments the information related to the quality of the radio link may as well correspond to information related to, for example, one or more elements of the group of a Receive Signal Reception Power (RSRP), a Signal-to-Interference Ratio (SIR), a Signal-to-Noise Ratio (SNR), a Signal-to-Interference-and-Noise Ratio (SINR), or a Receive Signal Strength Indicator (RSSI), etc. In the following any one of these measures is denoted as R and used in the following embodiment.

Figure 3:
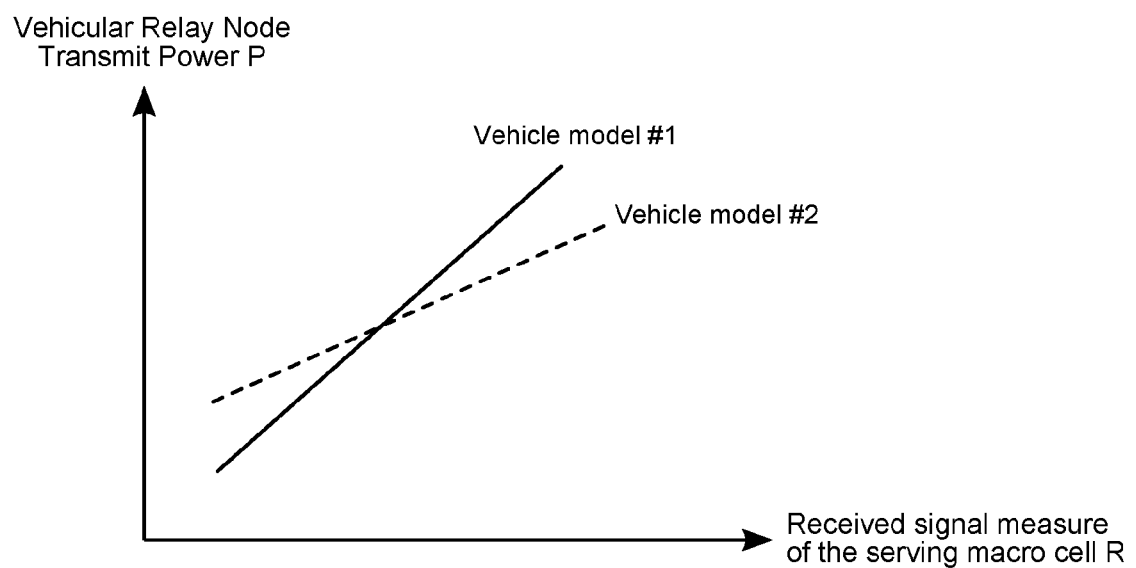
FIG. 3 shows a view graph of power control functions in embodiments.

In this embodiment P, i.e. the transmit power of the relay station relates to the received signal measure R by the function $P=f_i(R)$, where $f_i(R)$ may be resembled by a monotonic increasing function. In the present embodiment P is increased with increasing R. In the following the function $f(\bullet)$ and equivalently $f_i(\bullet)$ will be denoted as power control function. Note that the received signal measure R may be detected at the roof-top antenna of the vehicle 500 and then used in the vehicular relay node 100 to compute the corresponding transmit power P by using the controller module 14. The power control function $f_i(R)$ as well as $f(PL)$ from the previous embodiment, i.e., the exact relation between P and R, or equivalently between P and PL, and thus the adaptation of the transmit power of the vehicular relay node 100, may be adapted to the specific vehicle model and its specific propagation and/or attenuation characteristics. This is illustrated in FIG. 3. FIG. 3 shows a view graph of power control functions in embodiments, which are denoted as "vehicle model #1" and "vehicle model #2" in FIG. 3. FIG. 3 shows the transmit power P of the vehicular relay node 100, i.e. it transceiver module 12, on the ordinate and the received signal measure R of the serving macro cell 300 on the abscissa, i.e. the information related to the a quality of a radio link between the relay transceiver 100 and the base station transceiver 300. From the view graphs it can be seen that the power control function is a steadily increasing function in this embodiment, where its increase further depends on the vehicle model.

In general, in embodiments the power control function of the controller module 14 adjusts the transmit power of the vehicular relay node 100 in such a way that the interference of the relay node 100 to the macro layer outside of the vehicle is at an acceptable level or even minimum while the signal quality of the relay node 100 inside the vehicle is at a level at which the mobile transceivers inside the vehicle 500 can be served, in some embodiments even maximized.

Figure 4:
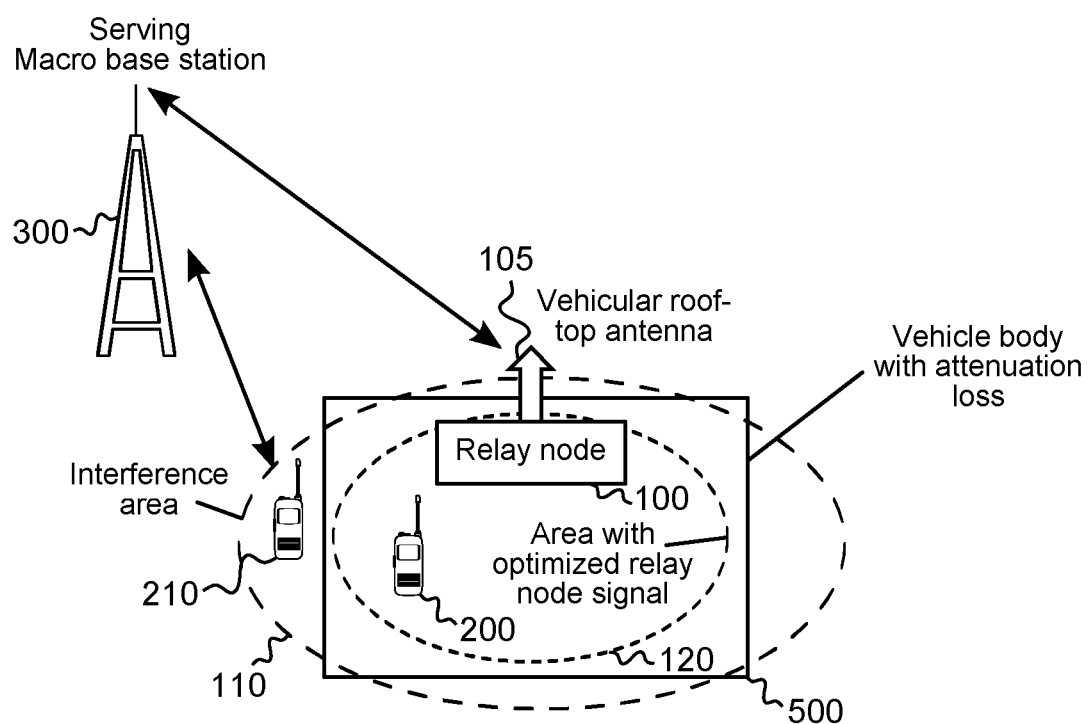
FIG. 4 shows a scenario with an embodiment of a relay apparatus adapting its coverage area.

FIG. 4 shows a scenario with an embodiment of a relay apparatus 100 adapting its coverage area. FIG. 4 shows a base station transceiver 300 as serving macro cell which serves the relay node 100 in the vehicle 500 with its vehicular roof-top antenna 105. The vehicle 500 is exemplified by the vehicle body with the attenuation loss, which may range, for example, from 10 dB up to 30 dB and more, supposing doors, windows and roof-top are closed. FIG. 4 further shows a coverage area 110, which indicates the radius, in which relay station 100 would generate severe interference to a mobile transceiver 210, which is located just outside the vehicle 300 and tries to communicate with the macro base station 300 if the transmit power P of the relay station 100 is too high. FIG. 4 further shows another coverage are 120 of the relay station 100, which is smaller than the coverage area 110, and which would not create severe interference for mobile transceiver 210, but still would be sufficient to serve the mobile transceiver 200 inside the vehicle. The coverage area 120 is the result of the embodiment adapting the transmit power P of the relay station 100. This may be achieved by setting P to a low value if R is low, or PL is high, and setting P to high value if R is high, or equivalently PL is low, respectively.

Another embodiment described in the following takes into account the interference outside of the vehicle 500 and how it is influenced, when windows, doors or roof-tops of the vehicle 500 are opened. In this embodiment the information related to the state of the vehicle 500 corresponds to information related to one or more elements of the group of a body attenuation of the vehicle, a window status, a roof-top status, a door status, a trunk status, a predicted change of a window status, a predicted change of a roof-top status, a predicted change of a door status or a predicted change of a trunk status. In the following the door and window status of the vehicle 500 will be considered as an example embodiment. The controller module 14 of the relay transceiver 100 adjusts the transmit power P triggered by vehicle sensor and context information. If, for example, the doors are opened, this information is used at the vehicular relay node 100 to adapt the power control function. This can be done in multiple ways. As a first way it is done again in such a way that the interference of the relay node 100 to the macro layer outside of the vehicle is reduced or even minimum while the signal quality of the relay node 100 inside the vehicle is kept acceptable or even maximized. It is to be noted that when the door opens the attenuation of the vehicle body drops and hence the relay station's 100 signal strength outside of the vehicle 500 will increase, therewith the interference radius will increase and the signal quality of mobile transceiver 210 will decrease.

Figure 5:
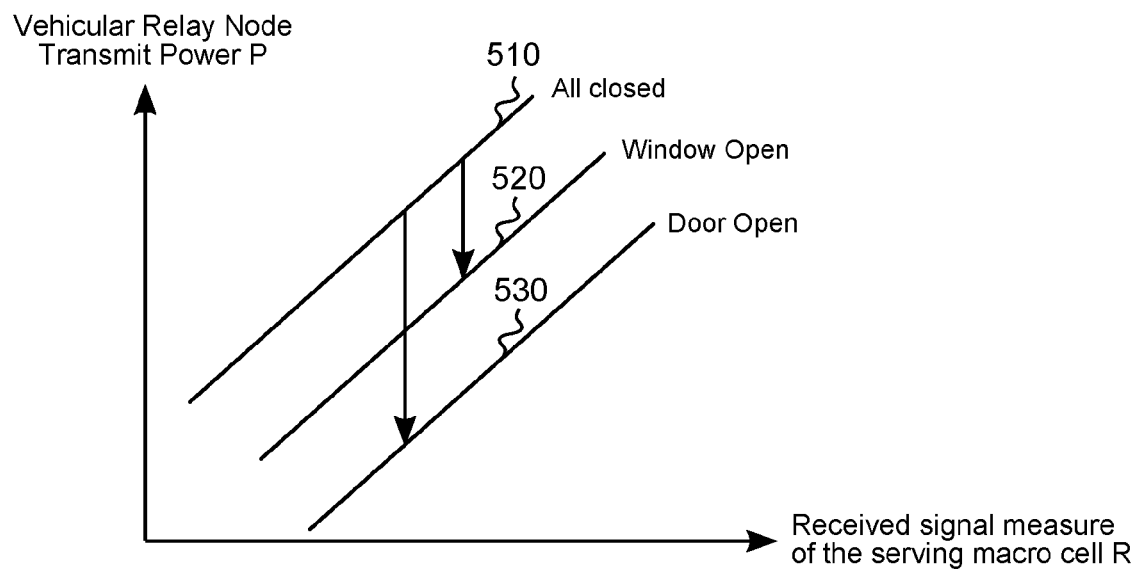
FIG. 5 illustrates a view graph showing power adaptations in an embodiment.

Considering the illustration of FIG. 4 the area of severe interference may increase, e.g. from area 120 to 110. The following considerations apply for both directions, i.e. the downlink direction and the interference, for example, generated by the common signal, and the uplink direction and the interference generated by the mobile transceiver 200 inside the vehicle 500 on the outside of the vehicle 500. When the door opens the signal strength of the macro cell 300 inside the vehicle 500 will also increase, hence the interference experienced by the mobile transceiver 200 will increase as well. This consideration supposes no other measures, as will be described subsequently, will be taken. Since the interference generated for the macro cell 300 is considered to be a priority in the present embodiment, the relay station 100 may decrease its transmit power P when the door or window opens. FIG. 5 illustrates a view graph showing power adaptations in some embodiments. FIG. 5 shows the vehicular relay node's 100 transmit power P on the ordinate and the received signal measure of the serving macro cell 300 R on the abscissa, i.e. the information related to the quality of the radio link between the relay transceiver 100 and the base station transceiver 300. The view graphs in FIG. 5 suppose the same vehicular model, e.g. "vehicle model #1" of FIG. 3. FIG. 5 shows three graphs 510, 520, and 530, where graph 510 illustrates the power control function when all windows and doors of the vehicle 500 are closed.

Graph 520 illustrates the power control function when a window is opened; it has the same increase as graph 510 with a down offset indicated by the respective arrow in FIG. 5. When the window opens the attenuation of the vehicle's body and therewith the transmit power P is reduced. In other words, when a window opens the transmit power P of the relay station 100 is reduced by an offset in order to limit the interference generated to the macro cell 300 outside the vehicle. As FIG. 5 further shows in graph 530 when a door opens the attenuation to the outside of the vehicle is even further reduced as compared to when only a window is opened. Accordingly the transmit power P is even further reduced by a larger offset as indicated by the arrow in FIG. 5. In the present embodiment the information related to the state of the vehicle 500 corresponds to information related to body attenuation, e.g. opening and closing of windows and/or doors, of the vehicle 500 with respect to radio signals transmitted from the transceiver module 12 to the mobile transceiver 200. The controller module 14 is operable to set the transmission power to a first higher value when the information related to the attenuation of the vehicle 500 body indicates a first higher attenuation. The controller module 14 is further operable to set the transmission power P to a second lower value when the information related to the attenuation of the vehicle 500 body indicates a second lower attenuation.

In the present embodiment the signal quality experienced by the mobile transceiver 200 inside the vehicle 500 may decrease as the doors and/or windows of the vehicle open. This is due to the increased interference experienced by the stronger signals from the macro cell 300 and by the power control function as shown in FIG. 5. In the present embodiment handovers of the inside mobiles 200 to the outside macro cell 300 may result. In yet another embodiment the power control function may increase the transmit power P of the relay station 100 by an offset when a window of the vehicle 500 opens and it may even further increase the transmit power P by another offset when a door of the vehicle 500 opens. In such an embodiment the relay station 100 may rather keep its own signal quality inside of the vehicle 500 at an acceptable level, e.g. to prevent the mobile transceiver 200 associated to the relay transceiver 100 from handing over to the macro cell 300. Hence, different criteria for the power control are conceivable and the criteria applied may further depend on the respective circumstances. In some embodiments, the applied criteria and power control strategy may depend on the signal quality of the macro base station transceiver 300. If the signal quality of the base station transceiver 300 is weak, the relay station transceiver 100 may increase the transmit power when a door or window opens to keep the mobile transceiver 200 from handing over. If the signal quality of the macro base station transceiver 300 is rather strong, then the relay station 100 may rather reduce its transmit power P when a door or windows opens, in order to avoid interference for the macro cell 300.

It is to be noted that in further embodiments the adaptation of the power control function may not necessarily be a simple offset shift, be it upwards or downwards, as illustrated in FIG. 5. Moreover, other vehicle context information that may lead to a specific adaptation of the power control function may, for example, be an open roof-top, or an open trunk or a combination of these. However, the adaptation of the power control may not only be triggered by specific actions such as opening doors, windows, etc., but by the pure anticipation of these actions. This means if due to actions of the passengers or the driver and detected by vehicle sensors, for example cameras in the passenger cabin, it can be predicted that a door, window or roof-top will be opened soon, the power control function can already be adapted accordingly.

Figure 6:
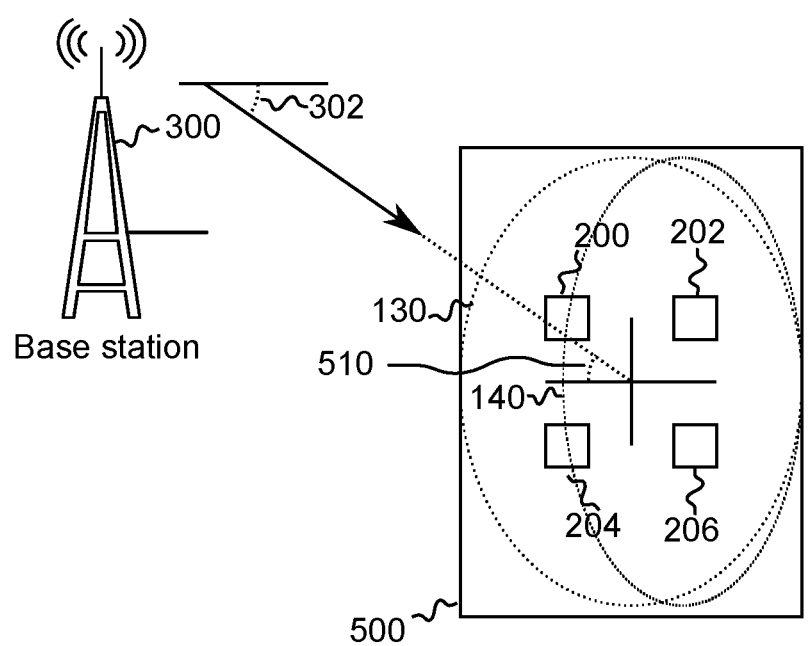
FIG. 6 illustrates an in-vehicle coverage area influence by an angle of arrival of the base station transceiver in an embodiment.

FIG. 6 illustrates an in-vehicle coverage area influence by an angle of arrival of the base station transceiver 300 in another embodiment. FIG. 6 shows the macro base station transceiver 300 transmitting a signal under a certain antenna boresight or transmission angle 302. The signal is received at the vehicle 500 from a certain direction or under a certain angle of arrival 510. FIG. 6 further shows four mobile transceivers 200, 202, 204, and 206 inside the vehicle 500 or car, which are presumably located on four passenger seats. In the vehicle 500 two coverage areas 130 and 140 of the relay transceiver 100 are illustrated, where the relay transceiver 100 itself is not shown for simplicity in FIG. 6. So if the signal from the base station transceiver 300 is rather weak the coverage area 130 of the relay applies and covers the four passenger seats and therewith the four mobile transceivers 200, 202, 204, and 206. If the signal strength of the macro base station 300 is strong then interference is created inside the vehicle 500 and the coverage area of the relay is deformed as indicated by coverage area 140. That is to say, the angle of arrival 510 of the signal from the base station transceiver 300 may influence the coverage inside the vehicle. On the side directed towards the base station transceiver 300, i.e. for mobile transceivers 200 and 204 the influence is higher than on the other side, i.e. for mobile transceivers 202 and 206. In the embodiment of FIG. 6 an omnidirectional antenna is assumed to be used by the relay inside the vehicle 500.

Figure 7:
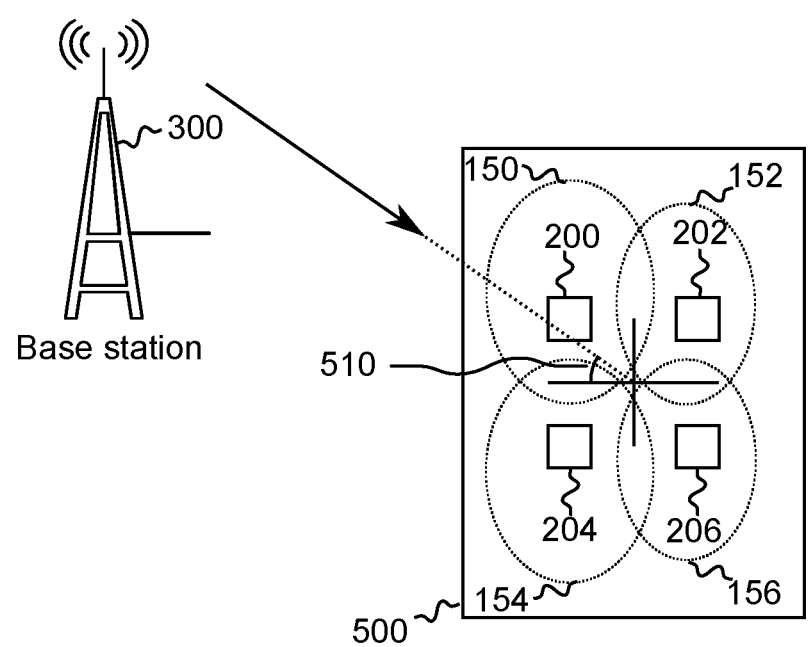
FIG. 7 illustrates an embodiment using an adaptive antenna inside a vehicle.

In the following embodiment the transceiver module 12 is operable to communicate with the mobile transceiver 200 using an adaptable antenna pattern of an adaptable antenna 16 comprising one or more antenna elements located in the vehicle 500. The controller module 14 is further operable to adapt the adaptable antenna pattern based on an angle of arrival of a signal received at the relay transceiver 100 from the base station transceiver 300. Hence, in this embodiment a vehicular roof-top antenna 105 is assumed which is capable of determining said angle of arrival 510. FIG. 7 illustrates an embodiment using an adaptive antenna inside a vehicle 500. FIG. 7 shows the same components as FIG. 6 but with four individual areas 150, 152, 154 and 156, which may use different power settings. It is to be noted that the larger areas 150 and 154 are not larger coverage areas but areas which are served with a higher power than the areas 152 and 156 in order to achieve similar coverage areas. These can be generated by different beams of a beamforming antenna or using individual antennas. FIG. 7 shows that a higher transmission power is used on the side of the vehicle which is faced towards the macro base station 300, i.e. the side of the vehicle 500 with the higher interference. The embodiment shown in FIG. 7 may use a separate antenna for each passenger seat.

Figure 8:
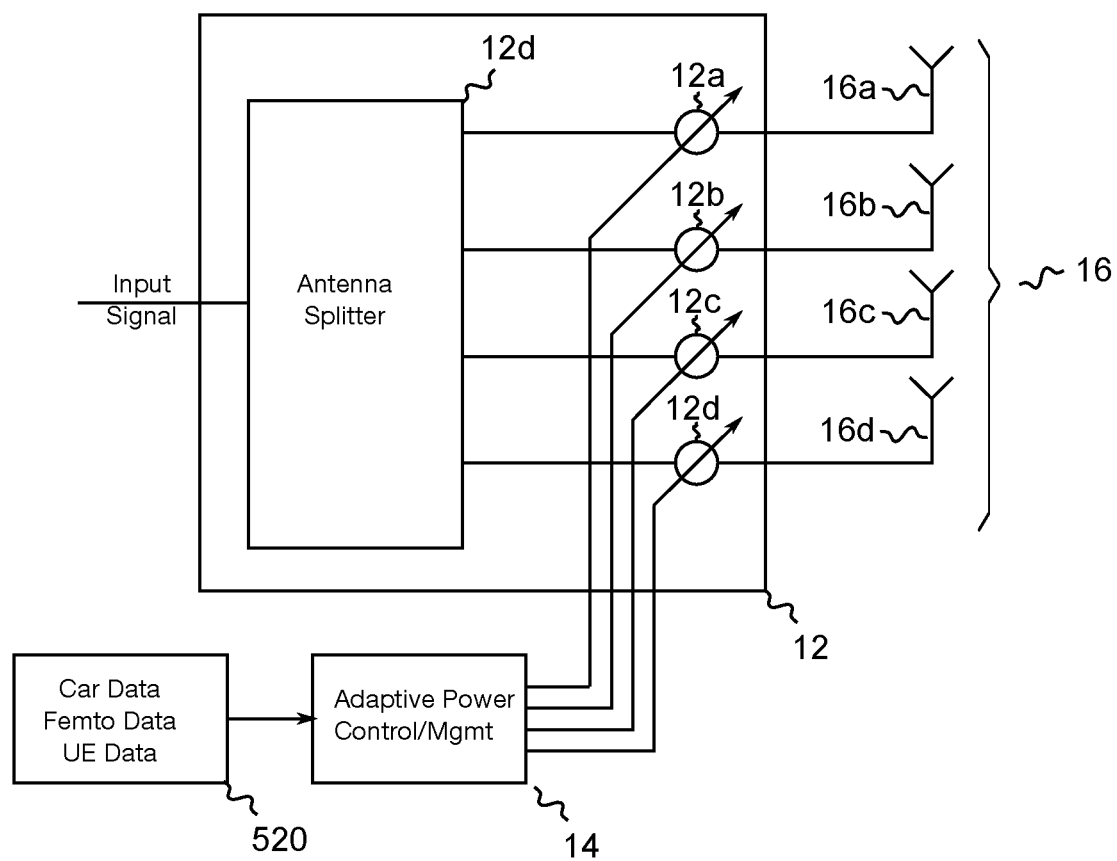
FIG. 8 shows a block diagram of adaptive antenna adjustment in an embodiment.

FIG. 8 shows a block diagram of adaptive antenna adjustment in an embodiment. FIG. 8 illustrates a controller module 14, which receives data from the vehicle 500, which is summarized in FIG. 8 by block 520 providing car data, femto data, UE data, etc. FIG. 8 further shows the transceiver module 12 operating an adaptive antenna 16 with four antennas elements 16*a*, 16*b*, 16*c*, and 16*d*, which are assumed to separately serve the four passenger seats in the vehicle shown in FIG. 7. The transceiver module further comprises four multipliers or power adjustment modules 12*a*, 12*b*, 12*c*, and 12*d*, which are operable to adjust the power of the individual transmit antenna elements 16*a*, 16*b*, 16*c*, and 16*d*. The power adjustments are controlled by the controller module 14, which carries out adaptive power control or management in the present embodiment. The transceiver module 12 further comprises an antenna splitter 12*d* which is coupled to the antenna elements 16*a*, 16*b*, 16*c*, and 16*d* and which receives an input signal, e.g. a more or less processed receive signal from the macro base station transceiver 300.

Some embodiments use several in-car antennas 16*a*-16*d* to provide femto cell coverage in a vehicle 500, as shown in FIGS. 6-8. Moreover, embodiments may provide a power control/management algorithm that allows to adapt the transmit power, e.g., the power of the Common PIlot CHannel (CPICH) power for Universal Mobile Telecommunication System (UMTS) femto cells or home NodeBs (NB), and thus the coverage areas of the individual in-car antennas. For example, each passenger seat in the vehicle 500 could have its own individual coverage area and corresponding antenna. However, it would also be possible to have a separate coverage area (and antenna) for the front and the rear seats, respectively. The power control algorithm in the femto cell or relay 100 may adapt the transmit power of the individual antennas based on context information. This context information could be data from the vehicle 500, from the femto cell 100, from the cellular network 300 or from the mobile terminals 200,202, 204, 206 inside the vehicle 500, also denoted as UEs. Based on this data the improved or even optimum power adjustments for the antennas 16*a*-16*d* may be derived in order to have an improved or even optimum coverage for each passenger in the vehicle 500 while creating reduced or even minimum interference outside of the vehicle 500.

For example, also compare FIG. 7, if the right front door opens, this information is fed to the power control algorithm in the controller module 14, which decreases the transmit power of the antenna that covers passenger or mobile transceiver 152, and thus creates reduced or even minimum interference outside of the vehicle 500. In another embodiment, if the macro signal is very strong and approaches the vehicle 500 from the left, this information is used to adjust the transmit power of the antennas covering passengers 200 and 204. In this embodiment the transmit power of those antennas would be increased to compensate for the coverage loss. The angle of arrival of the main interference signal, i.e. in the illustrated embodiments the signal from the macro base station transceiver 300, as well as its strengths can be derived in several ways in embodiments. The external antenna 105, cf. FIGS. 2 and 4, may measure the received SINR to detect the signal strength of the interferer or equivalently the serving macro base station 300 as well as its Multiple-Input-Multiple-Output (MIMO) antennas to the detect the angle of arrival of the interferer. The later could be derived based on the phase shifts of the received signal. Each UE 200, 202, 204, 206, inside the vehicle 500 may measure the received SINR and communicate this data to the power algorithm or controller module 14 in the femto cell or relay 100. In further embodiments, from a Global Navigation Satellite System (GNSS) position of the vehicle 500, as well as the received signal strength and the position of the serving macro base station 300 the angle of arrival may be computed.

Hence, some embodiments adapt the coverage area of the vehicular relay node 100 depending on vehicle context information and vehicle sensors. The coverage area of the vehicular relay node 100 may change dramatically, if a door or window of the vehicle is opened. This may cause increased interference outside of the vehicle. In further embodiments the transceiver module 12 is operable to communicate with the mobile transceiver 200 using an adaptable antenna pattern of an adaptable antenna 16 comprising one or more antenna elements located in the vehicle 500. The controller module 14 is further operable to adapt the adaptable antenna pattern based on the information related to the state of the vehicle 500. Hence, some embodiments may influence the antenna pattern used by the relay station to serve the inside mobile transceiver 200. By influencing the antenna pattern of the in-vehicle antennas, the coverage area of the vehicular relay node may be adjusted accordingly. The adaptable antenna 16 may correspond to a beamforming or beam-switching antenna comprising a plurality of antenna elements. The adaptable antenna 16 may as well correspond to a tiltable antenna. The controller module 14 is then operable to adapt the adaptable antenna 16 by forming or switching different beams or by tilting the antenna.

Hence in some embodiments, such antenna mechanisms could, for example, be multiple antenna techniques such as beamforming in order to steer the antenna pattern in a certain spatial direction and thus attenuate the transmit signal of the relay node 100 in the direction of the open window. In addition, the antenna pattern could be influenced mechanically, for example, by tilting the in-vehicle antennas 16. Such antenna mechanisms may be based on vehicle sensor/context information, such as the door contacts, window openers, etc. That is to say the controller module 14 is operable to adapt the adaptable antenna 16 based on information related to one or more elements of the group of sensor signals, door contacts, window openers or roof-top contacts. Moreover, the specific position of the door and window, that is open, can be taken into account to adjust the beam pattern of the in-vehicle antennas 16 in order to reduce the interference outside of the vehicle 500 and to optimize or improve the relay signal inside the vehicle 500.

Further embodiments may adjust the rate with which the relay's transmit power P is adapted by exploiting vehicle sensor information. In other words, the controller module 14 is then operable to determine, for example, information related to a velocity of the vehicle 500. The controller module 14 may then be further operable to set a repetition rate for transmission power adaptations based on the information related to the velocity of the vehicle 500. For example, if the vehicle 500 is moving with high speed a very frequent adaptation of the transmit power P may not be necessary since the probability of interfering with stationary UEs 210 outside the vehicle 500 is quite low. For example, imagine a vehicle 500 passing a pedestrian with high speed of 60 km/h; since the coverage/interference area of the vehicular relay node 100 passing influences the pedestrian UE 210 only for very short time, the pedestrian UE 210 may not experience any interference. That is to say that the transmit power P may be updated more frequently if the vehicle 500 is moving slow, and thus interference may pose a problem to macro layer UEs 210 outside of the vehicle, and only once in a while if the vehicle is moving fast, for example on the highway. Hence, the controller module 14 is then operable to set the repetition rate to a first more frequent repetition cycle when the information on the velocity of the vehicle 500 indicates a slower first velocity and the controller module 14 is then further operable to set the repetition rate to a second less frequent repetition cycle when the information on the velocity of the vehicle 500 indicates a faster second velocity. Moreover, embodiments using such a method may help to reduce the power or energy consumption of the vehicular relay node 100.

In even further embodiments, the controller module 14 is operable to set the repetition rate based on information related to one or more elements of the group of a vehicle acceleration, revolutions per minute, a camera or camera system, a radar sensor, a LIght Detection and Ranging or Laser Imaging Detection and Ranging (LIDaR) sensor, a location of the vehicle, a route, an arrival at the target destination, usage of Park Distance Control (PDC) sensors, vehicular traffic, or load of the communication system.

Figure 9:
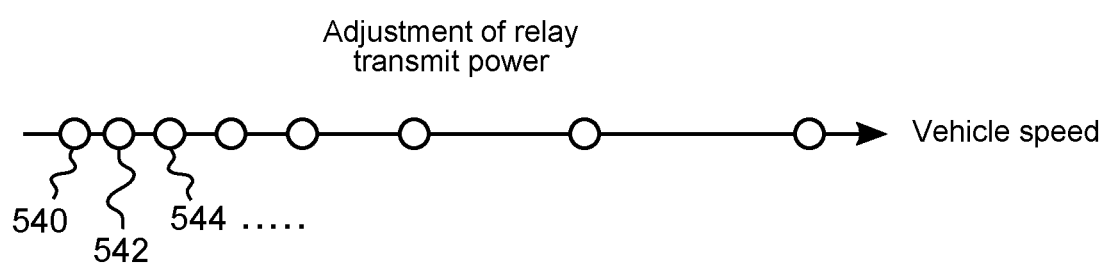
FIG. 9 illustrates power control adjustment cycles in an embodiment.

FIG. 9 illustrates power control adjustment cycles in an embodiment. In the embodiment a method is used to adjust the rate of the power control mechanism depending on speed of the vehicle 500. FIG. 9 shows a time line with an increasing vehicle 500 speed from the left to the right. The power control cycle or adjustments of the relay transmit power P are indicated by the dots 540, 542, 544, etc. It can be seen that the faster the vehicle 500 moves the rarer become the according adjustments. However, also other vehicle sensor and context information can be used to adjust the power control rate, such as vehicle acceleration, revolutions per minute, camera systems, radar sensors, LIDaR sensors, Global Positioning System (GPS) data, route information, arrival at the target destination, usage of PDC sensors, etc. As an example, if the route information indicates that the vehicle may pass geographical areas that are very crowded, the rate of the power control mechanism could be increased.

Figure 10:
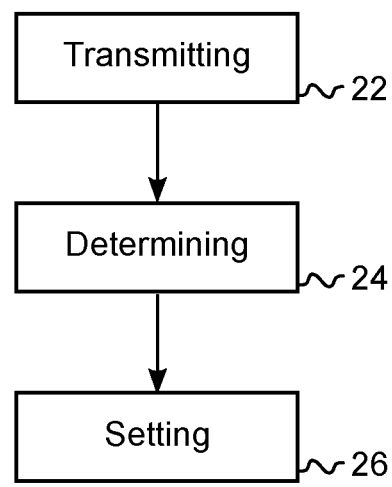
FIG. 10 shows a block diagram of a flow chart of an embodiment of a method for setting a transmission power of a vehicular relay transceiver.

FIG. 10 shows a block diagram of a flow chart of an embodiment of a method for setting a transmission power of a vehicular relay transceiver in a mobile communication system 400. The relay transceiver 100 is operable in a vehicle 500 to relay information between a mobile transceiver 200 associated with the relay transceiver 100 and a base station transceiver 300 of the mobile communication system 400. The method comprises transmitting 22 a common signal using a transmission power. The transmission power influences a coverage area of the relay transceiver 100. The method further comprises determining 24 information related to a quality of a radio link between the relay transceiver 100 and the base station transceiver 300 and information on a state of the vehicle 500. The method further comprises setting 26 the transmission power based on the information related to the quality of the radio link and based on the information on the state of the vehicle 500.

Embodiments may enable an adaptation of the transmit power and coverage area of a vehicular relay node 100 in such a way that the interference of the relay node 100 to the macro layer 300 outside of the vehicle is reduced or even minimum while the signal quality of the relay node 100 inside the vehicle 500 is kept at an acceptable level or even maximized. This may be achieved by taking into account vehicle sensor and context information, path loss or equivalently, received signal measurements and propagation or attenuation characteristics of specific vehicle models. Moreover, embodiments may allow for reducing the power or energy consumption and the computational complexity of the vehicular relay node.

Embodiments may further provide a computer readable storage medium storing instructions which, when executed by a computer, cause the computer to implement one of the methods described herein. Embodiments further provide computer programs or computer program product having a program code for performing anyone of the above described methods, when the computer program or computer program product is executed on a processor, computer, or programmable hardware.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media such as magnetic disks and magnetic tapes, hard drives, or optically readable digital data storage media. The embodiments are also intended to cover computers programmed to perform said steps of methods described herein or (field) programmable logic arrays ((F)PLAs) or (field) programmable gate arrays ((F)PGAs), programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Functional blocks denoted as "means for . . . " (performing a certain function) shall be understood as functional blocks comprising circuitry that is adapted for performing or to perform a certain function, respectively. Hence, a "means for s.th." may as well be understood as a "means being adapted or suited for s.th.". A means being adapted for performing a certain function does, hence, not imply that such means necessarily is performing said function (at a given time instant).

The functions of the various elements shown in the Figures, including any functional blocks labeled as "means", "means for transmitting", "means for receiving", "means for controlling", etc., may be provided through the use of dedicated hardware, such as "a transmitter", "a receiver", "a controller", etc. as well as hardware capable of executing software in association with appropriate software. Moreover, any entity described herein as "means", may correspond to or be implemented as "one or more modules", "one or more devices", "one or more units", etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

The invention claimed is:

1. An apparatus for setting a transmission power of a vehicular relay transceiver in a mobile communication system, the relay transceiver being operable in a vehicle to relay information between a mobile transceiver associated with the relay transceiver and a base station transceiver of the mobile communication system, the apparatus comprising
  a transceiver operable to transmit a common signal to the mobile transceiver using a transmission power, the transmission power influencing a coverage area of the relay transceiver; and
  a controller operable to determine information related to a quality of a radio link between the relay transceiver and the base station transceiver and information on a state of the vehicle and wherein the controller is further operable to set the transmission power of the common signal based on the information related to the quality of the radio link and based on the information on the state of the vehicle,
wherein the controller is operable to determine information related to a velocity of the vehicle and wherein the controller is further operable to set a repetition rate for transmission power adaptations based on the information related to the velocity of the vehicle.

2. The apparatus of claim 1, wherein the information related to the quality of the radio link corresponds to information related to one or more elements of the group of a path loss, a receive signal reception power, a signal-to-interference ratio, a signal-to-noise ratio, a signal-to-interference-and-noise ratio, or a receive signal strength indicator.

3. The apparatus of claim 1, wherein the controller is operable to set the transmission power to a first higher value when the information related to the quality of the radio link indicates a first higher quality of the radio link, and wherein the controller is operable to set the transmission power to a second lower value when the information related to the quality of the radio link indicates a second lower quality of the radio link and/or wherein the controller is operable to determine the information related to the state of the vehicle based on vehicular sensor data obtained from sensors comprised in the vehicle.

4. The apparatus of claim 1, wherein the information related to the state of the vehicle corresponds to information related to one or more elements of the group of a body attenuation of the vehicle, a window status, a roof-top status, a door status, a trunk status, a predicted change of a window status, a predicted change of a roof-top status, a predicted change of a door status or a predicted change of a trunk status.

5. The apparatus of claim 1, wherein the information related to the state of the vehicle corresponds to information related to a body attenuation of the vehicle with respect to radio signals transmitted from the transceiver to the mobile transceiver, and wherein the controller is operable to set the transmission power to a first higher value when the information related to the attenuation of the vehicle body indicates a first higher attenuation, and wherein the controller is operable to set the transmission power to a second lower value when the information related to the attenuation of the vehicle body indicates a second lower attenuation.

6. The apparatus of claim 1, wherein the transceiver is operable to communicate with the mobile transceiver using an adaptable antenna pattern of an adaptable antenna comprising one or more antenna elements located in the vehicle, wherein the controller is further operable to adapt the adaptable antenna pattern based on an angle of arrival of a signal received at the relay transceiver from the base station transceiver.

7. The apparatus of claim 1, wherein the transceiver is operable to communicate with the mobile transceiver using an adaptable antenna pattern of an adaptable antenna comprising one or more antenna elements located in the vehicle, wherein the controller is further operable to adapt the adaptable antenna pattern based on the information related to the state of the vehicle.

8. The apparatus of claim 7, wherein the adaptable antenna corresponds to a beamforming or beam-switching antenna comprising a plurality of antenna elements, or wherein the adaptable antenna corresponds to a tiltable antenna, and wherein the controller is operable to adapt the adaptable antenna by forming or switching different beams or by tilting the antenna.

9. The apparatus of claim 7, wherein the controller is operable to adapt the adaptable antenna based on information related to one or more elements of the group of sensor signals, door contacts, window openers or roof-top contacts.

10. The apparatus of claim 1, wherein the controller is operable to set the repetition rate to a first more frequent repetition cycle when the information on the velocity of the vehicle indicates a slower first velocity and wherein the controller is operable to set the repetition rate to a second less frequent repetition cycle when the information on the velocity of the vehicle indicates a faster second velocity.

11. The apparatus of claim 1, wherein the controller is operable to set the repetition rate based on information related to one or more elements of the group of a vehicle acceleration, revolutions per minute, a camera or camera system, a radar sensor, a Light Detection and Ranging or Laser Imaging Detection and Ranging sensor, a location of the vehicle, a route, an arrival at the target destination, usage of park distance control sensors, vehicular traffic, or load of the communication system.

12. A vehicle comprising an apparatus for setting a transmission power of a vehicular relay transceiver in a mobile communication system, the relay transceiver being operable in the vehicle to relay information between a mobile transceiver associated with the relay transceiver and a base station transceiver of the mobile communication system, the apparatus comprising:
a transceiver operable to transmit a common signal to the mobile transceiver using a transmission power, the transmission power influencing a coverage area of the relay transceiver; and
a controller operable to determine information related to a quality of a radio link between the relay transceiver and the base station transceiver and information on a state of the vehicle and wherein the controller is further operable to set the transmission power of the common signal based on the information related to the quality of the radio link and based on the information on the state of the vehicle,
wherein the controller is operable to determine information related to a velocity of the vehicle and wherein the controller is further operable to set a repetition rate for transmission power adaptations based on the information related to the velocity of the vehicle.

13. A method for setting a transmission power of a vehicular relay transceiver in a mobile communication system, the relay transceiver being operable in a vehicle to relay information between a mobile transceiver associated with the relay transceiver and a base station transceiver of the mobile communication system, the method comprising:
transmitting a common signal to the mobile transceiver using a transmission power, the transmission power influencing a coverage area of the relay transceiver;
determining information related to a quality of a radio link between the relay transceiver and the base station transceiver and information on a state of the vehicle;
setting the transmission power of the common signal based on the information related to the quality of the radio link and based on the information on the state of the vehicle;
determining information related to a velocity of the vehicle, and setting a repetition rate for transmission power adaptations based on the information related to the velocity of the vehicle.

14. A non-transitory computer-readable storage medium in which a program is saved, the program comprising instructions which, when executed in a computer or processor, cause the computer or processor to perform a method for setting a transmission power of a vehicular relay transceiver in a mobile communication system, the relay transceiver being operable in a vehicle to relay information between a mobile transceiver associated with the relay transceiver and a base station transceiver of the mobile communication system, the method comprising:
  transmitting a common signal to the mobile transceiver using a transmission power, the transmission power influencing a coverage area of the relay transceiver;
  determining information related to a quality of a radio link between the relay transceiver and the base station transceiver and information on a state of the vehicle;
  setting the transmission power of the common signal based on the information related to the quality of the radio link and based on the information on the state of the vehicle
  determining information related to a velocity of the vehicle, and
setting a repetition rate for transmission power adaptations based on the information related to the velocity of the vehicle.

* * * * *